United States Patent [19]
Cree

[11] Patent Number: 5,727,723
[45] Date of Patent: Mar. 17, 1998

[54] OSCILLATING HAULOFF

[75] Inventor: Robert E. Cree, Newark, N.Y.

[73] Assignee: Addex Design, Inc., Newark, N.Y.

[21] Appl. No.: 769,106

[22] Filed: Dec. 18, 1996

[51] Int. Cl.⁶ .......................... B65H 20/24; B65H 23/32; A01J 25/12
[52] U.S. Cl. .................. 226/119; 226/197; 425/326.1; 425/377
[58] Field of Search ................................ 226/118, 119, 226/197; 425/377, 378.1, 380, 326.1, 72.1

[56] References Cited

U.S. PATENT DOCUMENTS

| | | |
|---|---|---|
| 2,844,846 | 7/1958 | Kronholm . |
| 3,161,942 | 12/1964 | Cheney . |
| 3,231,651 | 1/1966 | Cheney . |
| 3,337,107 | 8/1967 | Catallo et al. ........................ 226/197 |
| 3,576,935 | 4/1971 | Dyer et al. . |
| 3,632,265 | 1/1972 | Upmeier . |
| 3,657,974 | 4/1972 | Hedrich et al. . |
| 3,684,421 | 8/1972 | Pilcher . |
| 3,716,322 | 2/1973 | Kratzert . |
| 3,768,949 | 10/1973 | Upmeier . |
| 3,804,572 | 4/1974 | Upmeier . |
| 4,533,309 | 8/1985 | Planeta ................................ 425/326.1 |
| 4,634,358 | 1/1987 | Dellbrugge . |
| 4,643,656 | 2/1987 | Karl . |
| 4,650,406 | 3/1987 | Peters . |
| 4,650,407 | 3/1987 | Taguchi . |
| 4,676,728 | 6/1987 | Planeta . |
| 4,682,941 | 7/1987 | Upmeier et al. . |
| 4,760,627 | 8/1988 | Schele . |
| 4,836,744 | 6/1989 | Karl et al. . |
| 5,013,234 | 5/1991 | Reinhold . |
| 5,106,281 | 4/1992 | Achelpohl . |
| 5,310,329 | 5/1994 | Cree . |
| 5,567,445 | 10/1996 | Cree et al. . |

*Primary Examiner*—Michael Mansen
*Attorney, Agent, or Firm*—Hale and Dorr LLP

[57] ABSTRACT

An oscillating hauloff device for removing blown film from an extruding apparatus has an arrangement of idler rolls for passing film through the unit to provide constant film path length within the hauloff and constant speed of the film exiting the hauloff.

25 Claims, 8 Drawing Sheets

OSCILLATING HAULOFF

BACKGROUND OF THE INVENTION

The present invention relates to an oscillating hauloff device for removing blown film from an extruding apparatus.

An oscillating hauloff receives film from an extruding apparatus and oscillates as the film is received to even out locations where there are variations in the gauge of the film. An oscillating hauloff thus has an oscillating portion for receiving the film, and a stationary portion for receiving the film from the oscillating portion and for providing the film to other equipment, such as a winder.

When blown film is extruded, it is typically is in the form of a bubble. The hauloff has nip rolls that force together the sides of the bubble. As the bubble passes through the nip rolls, there are variations in the gauge of the film. If the film were wound directly onto a roll, thicker areas of the film would increasingly cause some parts of the wound roll to build up faster than others, thus creating hills and valleys in the roll.

Problems occur when an uneven roll is unwound and provided to converting equipment, such as printing presses, laminators, or bag machines. Uneven rolls considerably reduce the speed of such equipment and also reduce the quality of finished products. The unevenness causes slack in some areas of the film and tightness in other areas, thereby causing creases. On a printing press, ink will not transfer to film inside a crease, so product quality is degraded. Manufacturing processes often have to use spreader rolls or some other means to try to eliminate these creases, but these additional processing steps complicate and slow down the process. Bag machines have several nip rolls for drawing the film into a sealing and/or punching area. When film is drawn through the nip rolls, slack areas cause further creases. If a crease is located where a seal is placed, that seal will be defective.

In all cases, the better the quality of the roll, the faster one can run downstream equipment and the greater the probability of producing a better quality product. While there have been attempts to improve quality, there are still a number of deficiencies.

One attempt to improve quality has been to use a horizontal oscillating hauloff design. In such a design, the film lies in a horizontal plane as it is provided out from the oscillating portion of the hauloff. Examples of such a horizontal design are found in U.S. Pat. Nos. 5,567,445 and 4,634,358, each of which is incorporated herein by reference for all purposes. Early horizontal devices had stability problems, and also had side-to-side swaying because a single, vertical, small diameter shaft was used for support. Current systems typically employ large diameter thrust bearings which eliminate stability problems and also solve problems associated with weight restrictions imposed by a small shaft.

Another problem in earlier devices was uncontrolled wandering of the film. In typical horizontal designs, there are two turning bars that constantly change angles with respect to the film and work together to allow for a total oscillation of 360°. As with any turning bar, frictional forces cause a slight shift in axial position as the film passes around its diameter, thereby causing the film to wander and wrinkle. As a result, although normal variations in the gauge are spread evenly over the surface of the wound roll, wrinkles and creases due to wandering are also wound into the finished roll. Current horizontal systems solve this problem by either guiding with the second turning bar or by self-canceling the wandering effects by opposing the two turning bars.

Another design that solves this wandering problem is a vertical oscillating hauloff. Examples of such a system are found in U.S. Pat. Nos. 4,760,627 and 4,676,728, each of which is incorporated by reference. In such systems, the oscillating portion turns the film so that it lies on edge in a vertical plane as it is provided from the oscillating portion. A stationary portion then turns the film so that it is provided from the hauloff in a horizontal plane. Current vertical oscillating hauloff systems thus employ two turning bars to randomize gauge bands, with the turning bars held at a constant angle to the film. The film is first turned on edge and then is sequentially wrapped around several vertically mounted idler rollers (idlers). Once wrapped around the idlers, the unit reverses direction and unwinds the film. This approach is less complex and less expensive than the horizontal design.

This typical vertical design has some significant problems. Because the system accumulates and de-accumulates film (i.e., the path length increases and decreases) as the unit rotationally oscillates and the film goes around multiple vertical idlers, the overall speed of the film speed exiting the hauloff slows because some of the speed is taken up by the accumulation, and thus the line speed decreases. When the oscillating portion changes direction, the line speed increases. Depending on how fast the oscillating portion is rotating, this effect can cause sizable variation in line speeds, thus causing significant film walking in the winder, and thereby degrading the quality of the roll of film.

Another problem associated with vertical design hauloffs is that as line speed varies, significant variations occur in the tension. Additionally, as the unit sequentially wraps each idler roll with film, the resistance to the turning of each idler roll creates drag on the film and thus further affects the tension. In the portion of the hauloff where the film travels on end, gravity moves the film as the tension varies, thereby causing tracking problems and hence poorer roll quality or lost trim. If the tension drops too low, wrap-ups can occur in the hauloff causing the extrusion line to shut down. Some recent vertical systems are designed to rotate more than 360°, but such rotation creates more of a problem because more idler rolls are wrapped further exacerbating the frictional tension effects. An approach to prevent problems associated with minor variations in tension is provided in U.S. Pat. No. 4,676,728. As mentioned in that patent, a dancer roll, which is normally retracted, can be brought into contact when such minor variations in tension occur such that the dancer roll partially extends to hold the film in place. If the variation in tension is too low for too long, however, the film will wrap-up. This system, however, still has the major problem of line speed shifts when the hauloff reverses direction of accumulation.

Unlike horizontal systems, vertical systems typically require an exit nip roll to isolate variations in tension in the hauloff from the rest of the line to combat the subsequent deleterious effects on roll quality or loss of production. The extra nip roll adds to the complexity and costs of the vertical design.

It would be desirable to have an oscillating hauloff with the simplicity of a vertical design, but without variations in line speed and without requiring the added complexity and cost of an extra nip roll.

SUMMARY OF THE INVENTION

The present invention includes an oscillating hauloff that has an oscillator for oscillating film from an extruding apparatus and for providing the film in a vertical plane as on-edge film such that the film is accumulated and de-accumulated as the path length increases and decreases. The hauloff has a stationary anti-accumulator that receives the on-edge film and de-accumulates the film when film is being accumulated by the rotating motion of the oscillator, and accumulates film at the same rate that film is de-accumulated by the rotating motion of the oscillator when the oscillator reverses direction. The anti-accumulator decreases and increases the path length of the film between the oscillator and the output of the hauloff as the path length in the oscillator increases and decreases, respectively, so that the total path length through the oscillator and the anti-accumulator remains constant.

The invention also includes a method for removing film from an extruding device including steps of receiving film from an extruding device, oscillating the film and providing the film from an oscillator on-edge, and, in a stationary anti-accumulator portion that receives the on-edge film, altering the path length of the film through the stationary portion such that the path length of the film in the stationary portion increases when a path length in the oscillating portion decreases, and increases when the path length decreases in the oscillating portion.

In preferred embodiments, the stationary portion has at least two rollers, and preferably three idlers, with film being provided from a first idler to a second idler. One of the first and second idlers is movable relative to the other for changing the path length of the film as it passes from the first idler to the second idler. The movement of the movable idler is controlled preferably by a constant length of cable that follows the same path the film takes, but is spaced from the film. A hanging weight is provided to hold the cable tightly in place and to overcome tension that might develop in the normal processing of blown film. As the hauloff rotates, the total path taken by the film through the unit is held constant by the cable. As the path length changes due to rotation of the oscillating portion, the path length in the stationary anti-accumulator portion thus changes by an equal and opposite amount.

Such an anti-accumulator and constant path length method prevent variations in the speed of the film exiting the stationary portion of the hauloff (i.e., it maintains constant speed). An exit nip roll is not required because line speed is constant and therefore film tension remains relatively constant except for the smaller, more manageable effects of friction in the idler roll. The control system is mechanically simple and is passive, and need not be a complex and expensive control system. Other features and advantages will become apparent from the following detailed description, the drawings, and the claims.

DETAILED DESCRIPTION

Figure 1:
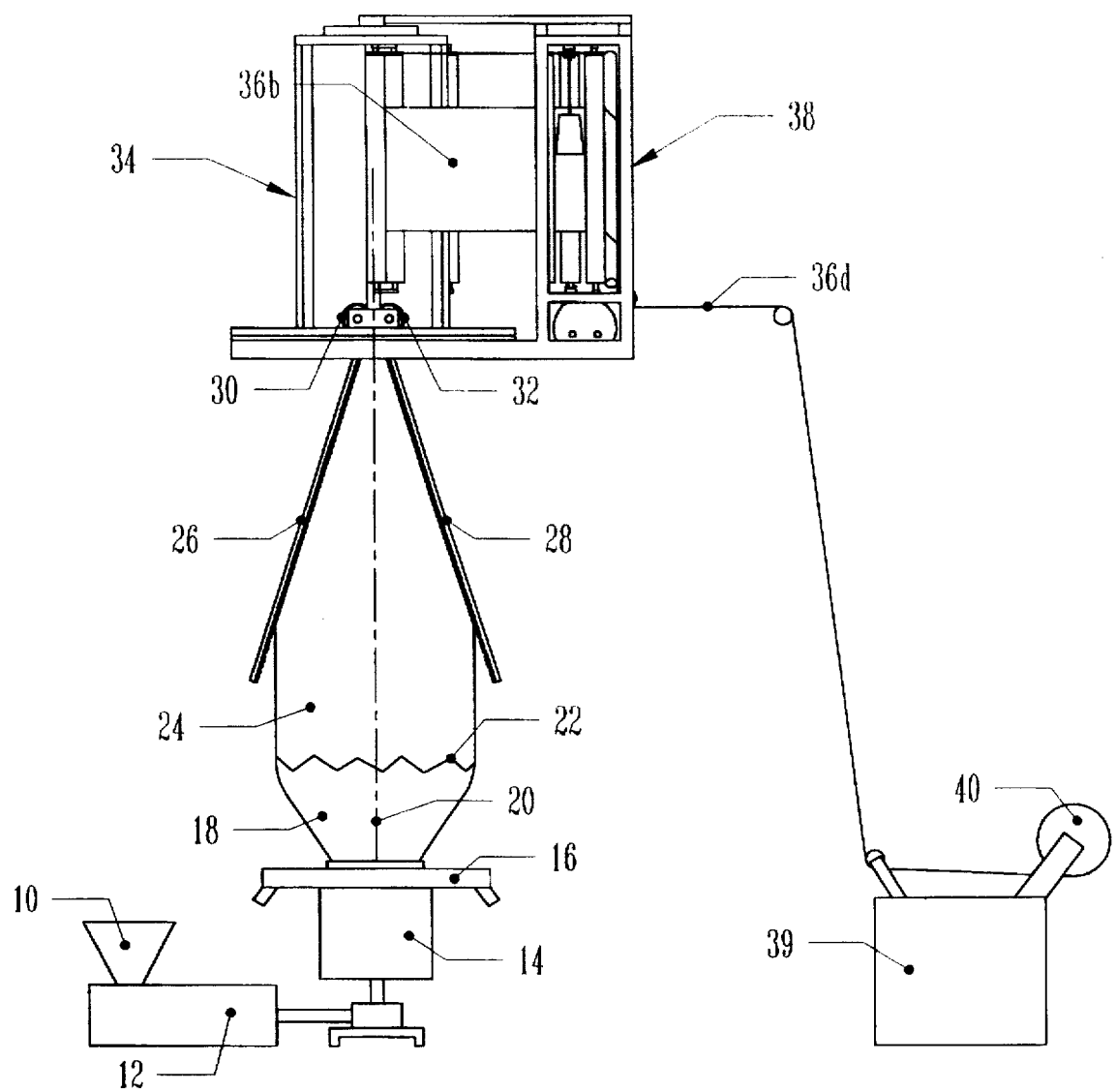
FIG. 1 is a schematic side view of an extrusion line and an oscillating hauloff according to the present invention.

Referring to FIG. 1, plastic resin is provided into an extruder 12 through a holding bin 10. Extruder 12 provides a plastic melt to the bottom of a blown film die 14, which in turn provides an annular plastic melt concentric with a process centerline 20. The melt passes through a cooling ring 16 and forms an expanding molten tube 18 into a continuous cylindrical bubble 24 above a freeze line 22. Bubble 24 is converted to a flat sheet of film as it passes through collapsing shields 26 and 28. The film then passes between motorized nip rolls 30 and 32, which continually draws the film upwardly.

Collapsing shields 26 and 28 and nip rolls 30 and 32 are attached to an oscillating portion 34 of the hauloff. As shown in more detail in FIGS. 4–8 and discussed below, oscillating portion 34 oscillates through 360° of rotation about a central unit axis parallel to (including the same as) centerline 20 while receiving the film and standing the film vertically on edge. Rotating portion 34 provides on-edge film 36b to stationary turning portion 38 where the film is turned to the horizontal plane and exits the unit as film 36d. Film 36d is conveyed to a winder 39 where it is wound up on a roll 40. (Note that the film is referred to generally as film 36, while film 36a–36d refers to the film at different portions of the path that the film takes.)

Figure 2:
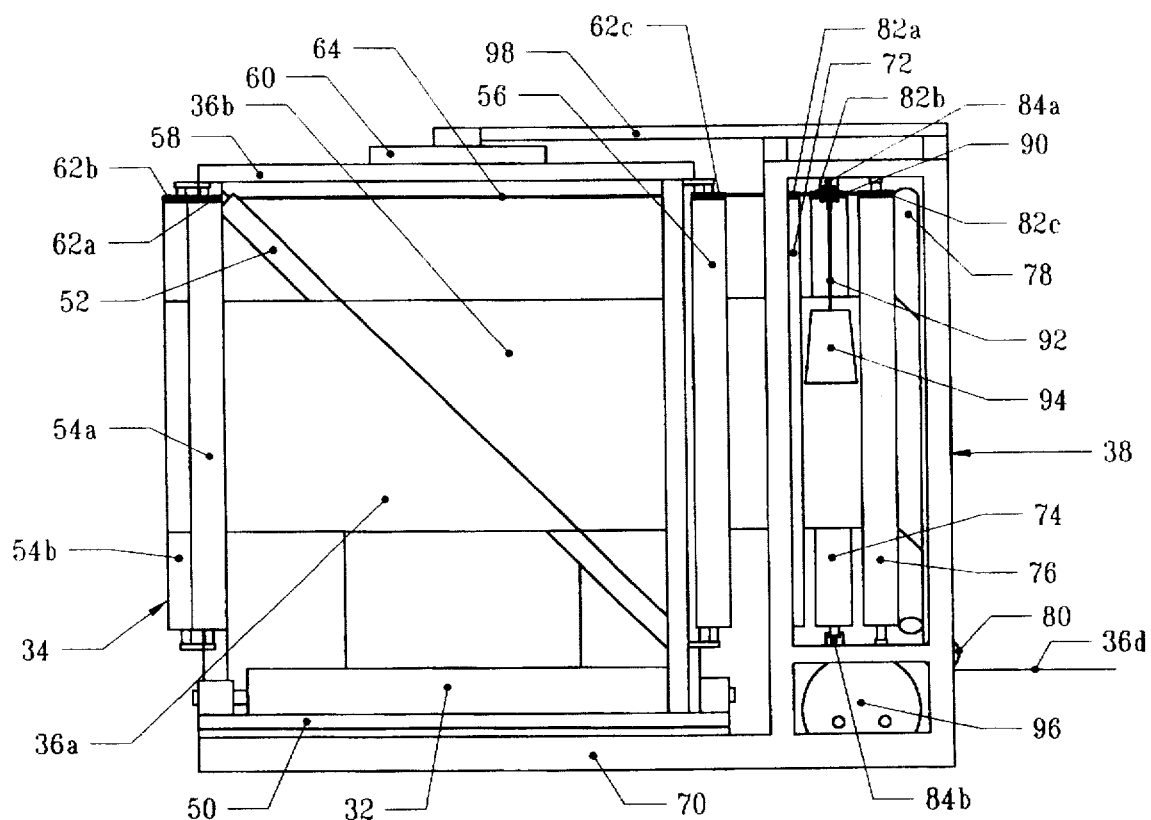
FIGS. 2 and 3 are a side view and a plan view, respectively, of the oscillating hauloff of FIG. 1, shown rotated fully counter-clockwise (CCW) to 0°.
Figure 3:
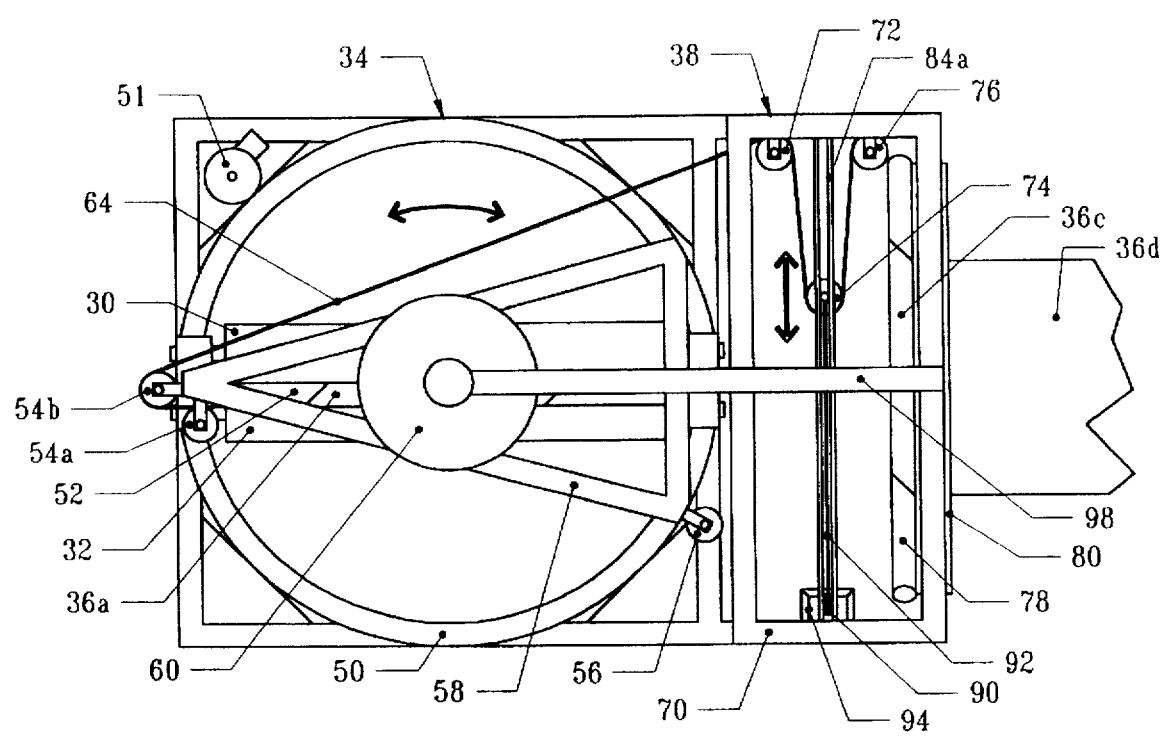

Referring to FIGS. 2 and 3, nip rolls 30 and 32 are mounted on a ring 50 that is rotationally oscillated relative to a stationary frame 70. As film 36a passes upwardly between nip rolls 30 and 32, it passes around a turning bar 52 which turns film 36a by 90° and stands film 36a on edge. Film 36a passes to idlers, 54a and 54b. In this position, the film wraps around idler 54b and passes out of oscillating portion 34 as on-edge film 36b, which lies in a vertical plane. In other positions of rotating portion 34, as shown in FIGS. 4–8 and described below, film 36b can wrap around idler 54a only, or around idlers 54a and 56. Turning bar 52 and idlers 54a, 54b, and 56 are rigidly mounted to frame 58 so that they rotate together with ring 50 relative to stationary frame 70. A motorized driver 51 mounted to frame 70 engages rotating ring 50 to cause ring 50 to rotate.

On-edge film 36b enters stationary portion 38 and passes around an idler 72, where the film is referred to as film 36c. Film 36c is redirected by idler 72 to an anti-accumulator idler 74, and then to a second rigidly fixed idler 76. The film then passes to a second turning bar 78 which turns film 36cby 90° so that the film again lies substantially in a horizontal plane. Film 36c then passes around idler 80 to exit the stationary portion 38 as film 36d, which is then provided to downstream equipment.

Idlers 72, 74, and 76 are each vertically oriented, and in parallel. Idlers 72 and 76 are rigidly mounted to stationary frame 70, but idler 74 located between idlers 72 and 76 (along the film's path) is slidably mounted in tracks 84a and 84b at the top and bottom of idler 74, respectively, such that idler 74 remains between idlers 72 and 76. For convenience, tracks 84a and 84b are oriented along a direction generally perpendicular to the direction in which film 36d exits stationary portion 38.

FIGS. 4–8 illustrate five different positions for the oscillating portion 34, and how the path length of film 36b varies from turning bar 52a to idler 72 as oscillating portion 34 rotates, and illustrate how idler 74 moves in response to this variation in path length within the oscillating portion. Note that in these figures, certain components, such as frame 70 and a cable 64, are not shown to make it easier to see certain components; cable 64 would be above film 36b and 36c.

Figure 4:
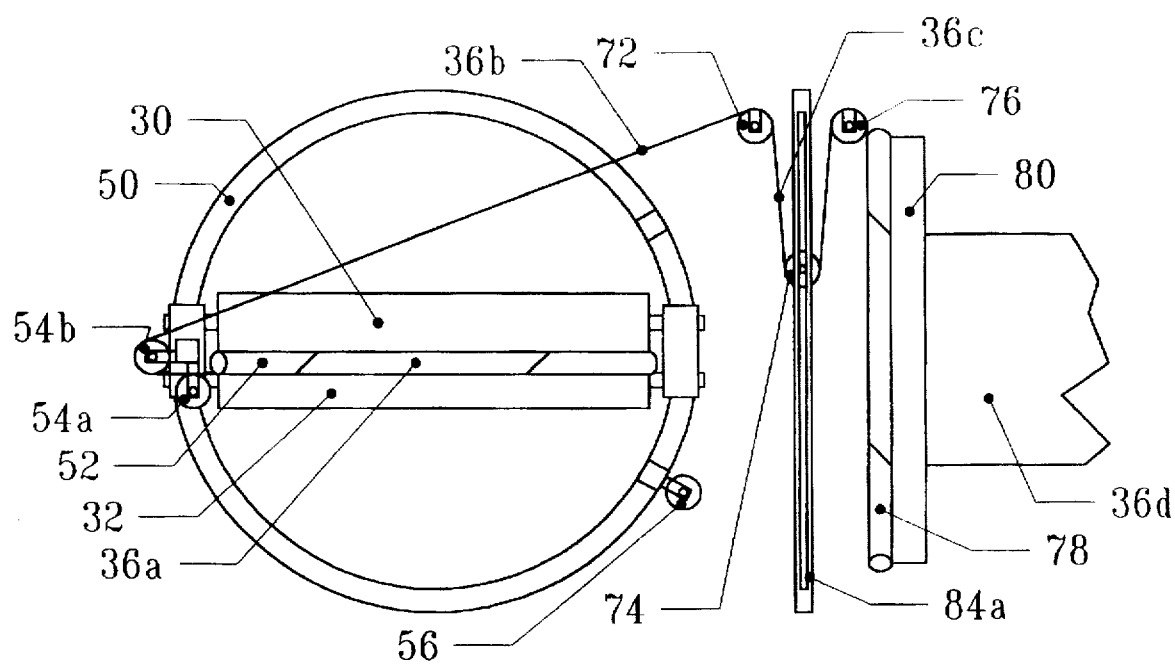
FIGS. 4–8 are plan views, illustrating the oscillating hauloff rotated fully CCW to 0° position, in the 90°, the 180°, 270°, and 360° clockwise position, respectively.

In FIG. 4, the oscillating portion with ring 50 is at its full counter-clockwise (CCW) position. In this position, film 36a passes from nip rolls 30 and 32 to turning bar 52 and against idler 54a, and film 36b passes around idler 54b, and then in a straight line to idler 72. In this position, idler 74 is at a certain location relative to idlers 72 and 76, thereby governing the path length of film 36c.

Figure 5:
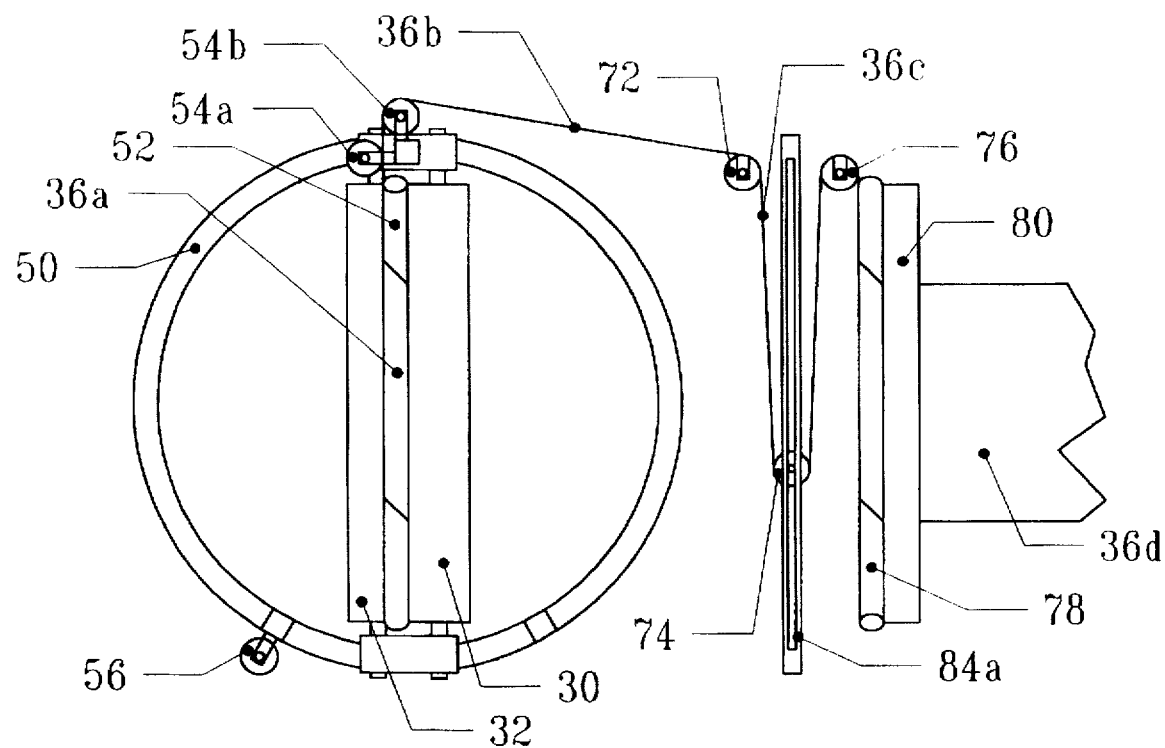

As shown in FIG. 5, ring 50 and hence turning bar 52, idler 54a, and idler 54b have rotated 90° degrees clockwise (CW). The film follows a similar path to that in FIG. 4, with the main difference being that the distance from idler 54b to idler 72 is shorter, and thus the path length of film 36b is shorter and the portion is de-accumulating. Meanwhile, idler 74 has moved further away from idlers 72 and 76, thereby lengthening the path of film 36c. According to the present invention, the reduction in the length of the path of film 36b is equal to the increase in length of the path of film 36c. In other words, the sum of the path of film 36b in the oscillating portion and the path of film 36c in the stationary portion is constant.

Figure 6:
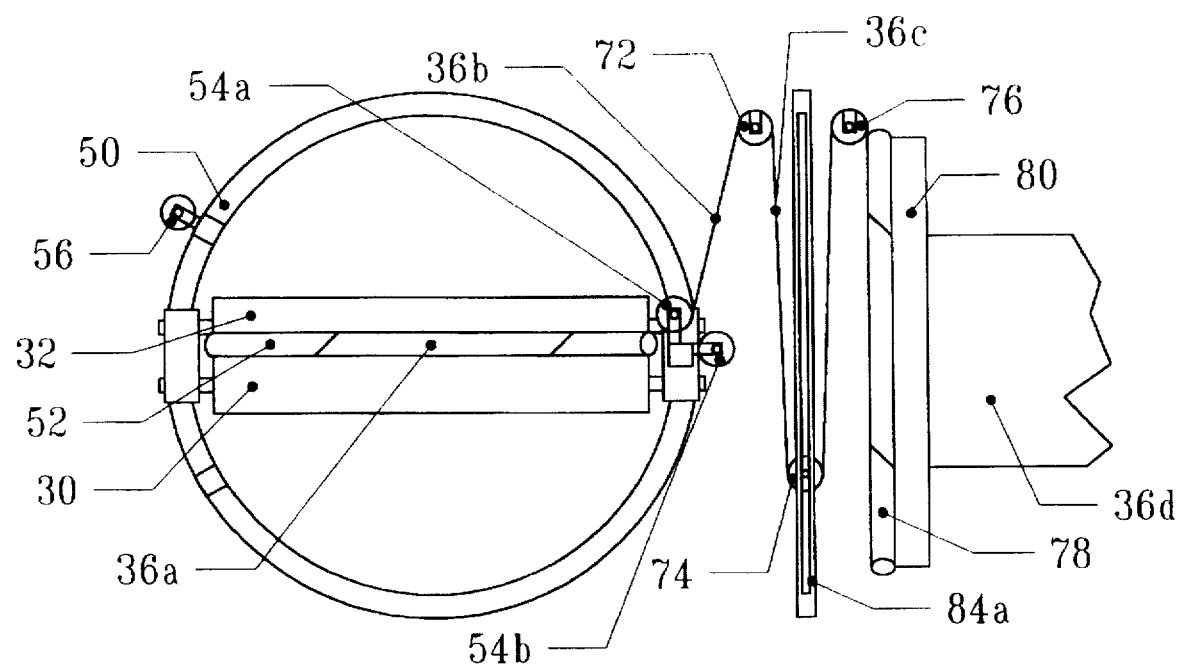

Referring to FIG. 6, at 180°, film 36b passes from idler 54a, (but not idler 54b), and the path of film 36b is shorter than in either FIG. 4 or FIG. 5. Idler 74 has moved further from idlers 72 and 76 in FIG. 6, thereby increasing the path of film 36c by an amount equal to the reduction in the path length of film 36b.

Figure 7:
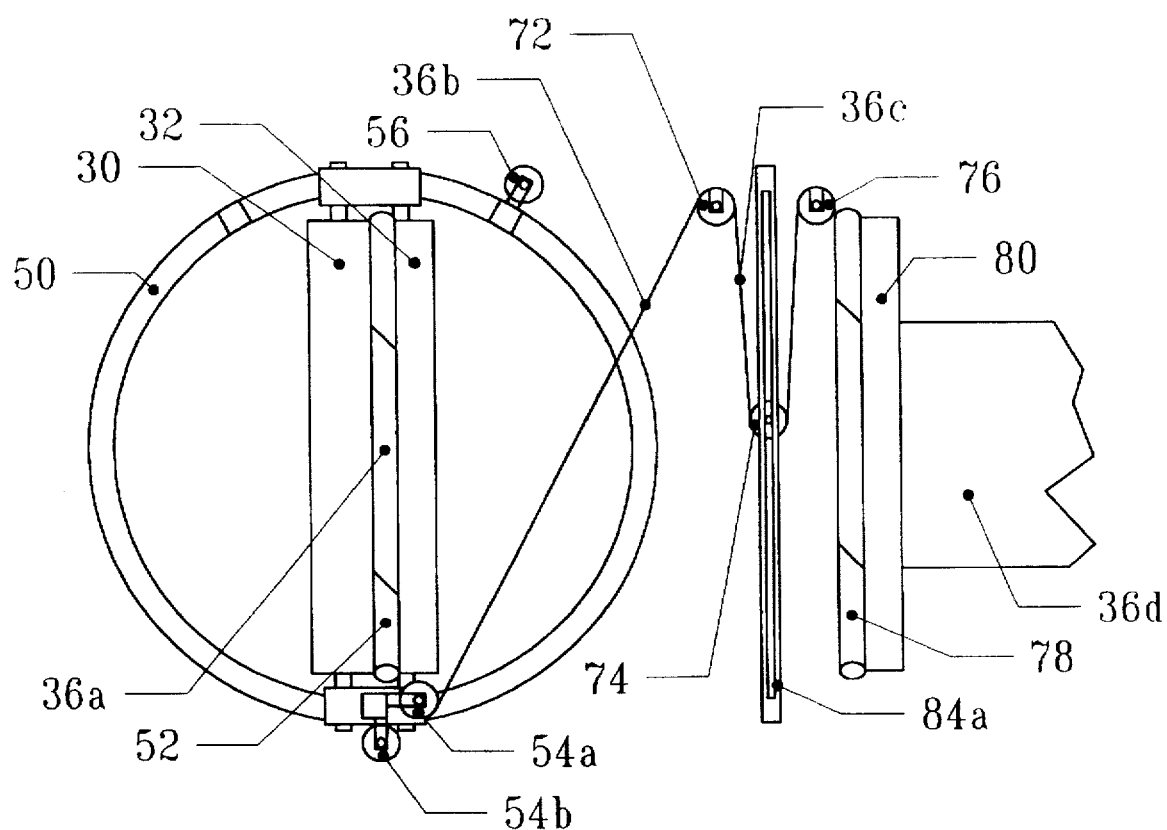

In FIG. 7, at 270° CW, the path of film 36b is significantly increased, while still passing from idler 54a and not idler 54b. Idler 74 has now moved closer to idlers 72 and 76 to shorten the path length of film 36c by an amount equal to the increase of film 36b.

Figure 8:
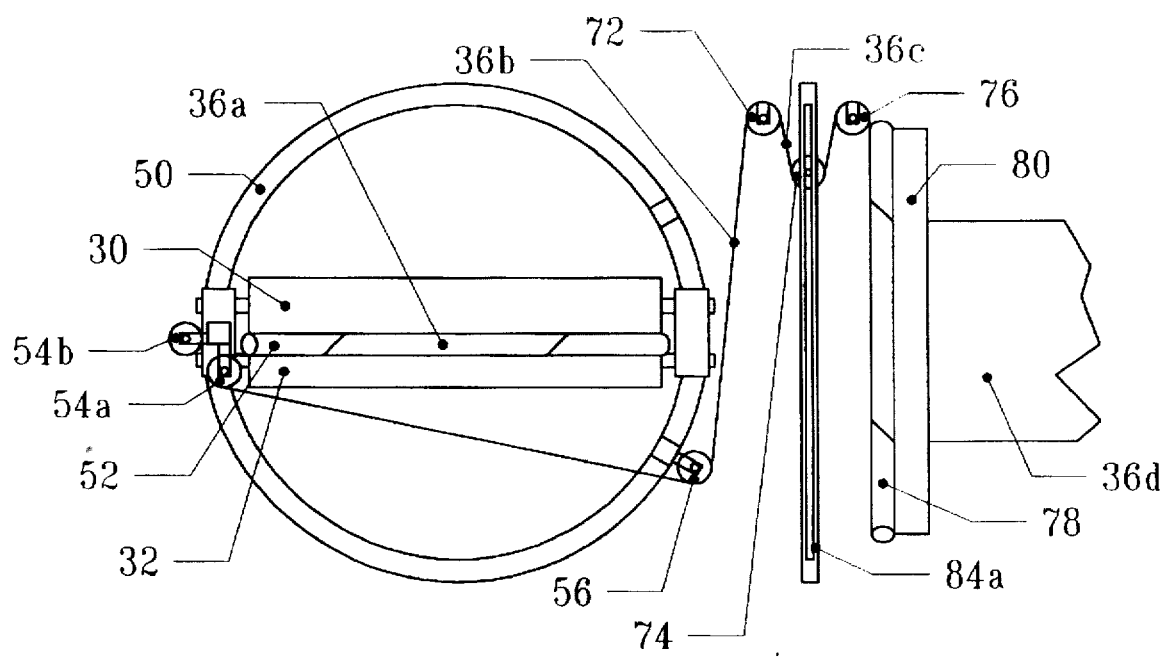

Referring to FIG. 8, as 360° CW, ring 50 is in the same place as in FIG. 4, but the film path is different. The path of film 36b is at its longest as film 36b passes from idler 54a and around idler 56 on its way to idler 72. Idler 74 is at a position very close to idlers 72 and 76 to create a short path length for film 36c. From this position, ring 50 reverses direction until it reaches the position of FIG. 4.

Referring again to FIGS. 2 and 3, the control system for maintaining this constant combined path length of film 36b and 36c is preferably mechanical and passive to minimize complexity and cost. More complex control systems could be used, e.g., an electrically controlled motor for moving idler 74 based on signals from sensors sensing the rotation of the oscillating portion, although such systems would be more complex and costly.

According to an embodiment of the present invention, a cable 64 is mounted so that it follows the same path as film 36b and 36c, but is spaced from the film so as not to interfere with the movement of the film. As shown here, cable 64 is directly over film 36b and 36c and therefore blocks the view of the film. One end of cable 64 is rigidly fixed in oscillating portion 34 such that cable 64 must pass between idler 54a and 54b to follow film 36b. Another end of cable 64 is rigidly connected at a point just after film 36c path passes around idler 76 in stationary portion 38.

A weight 94 is hung to apply a tensioning force to idler 74 through a tensioning cable 92 and in a direction toward a pulley 90 mounted on frame 70. The tensioning force applied to idler 74 holds cable 64 tightly in place. As oscillating portion 34 changes position, the path length of on-edge film 36b changes accordingly, and cable 64 causes idler 74 to move along tracks 84a and 84b such that the path length of film 36c changes by an equal and opposite amount. The tensioning force applied to idler 74 by weight 94 should be large enough to overcome the tension forces of film 36, the tensioning force needed for cable 64, and the frictional forces required to move idler 74 along tracks 84a and 84b. The tensioning force could be applied by other means such as an air-loaded cylinder.

To ensure that cable 64 follows the same path as film 36, idler pulleys 62a, 62b, and 62c, having the same diameter as idlers 54a, 54b, and 56, respectively, are mounted directly adjacent to and coaxially on the same mounting shaft with each respective idler 54a, 54b, and 56 inside oscillating portion 34. Idler pulleys 82a, 82b, and 82c, with the same diameter as idlers 72, 74, and 76, respectively, are mounted adjacent to and coaxially on a common shaft with each respective idler 72, 74, and 76.

By maintaining a constant path length for film 36 from oscillating portion 34 through stationary portion 38, the system of the present invention ensures that the speed of film 36d provided from the hauloff to another system, such as a winder, remains constant and consistent in tension.

A blower 96 is mounted to stationary frame 70 to provide a filtered source of air for turning bars 52 and 78 as described in incorporated U.S. Pat. No. 5,567,445. Air for turning bar 52 and other utilities such as compressed air, water, and electrical power are brought to rotating portion 34 with a utility arm 98 fixed to stationary frame 70 and overhanging the center of rotating portion 34. A utility tray 60, mounted on top of a rotating frame 58, receives utilities by allowing them to coil up and uncoil as rotating portion 34 rotationally oscillates back and forth.

Having described certain embodiments, it should be understood that modifications can be made without departing from the spirit and scope of the invention as defined in the appended claims. While a number of components have been referred to as idlers, which are one type of roller, these can be replaced by other types of rollers, including driven rollers. While only one vertical roller, idler 56, has been shown along the circumference of the oscillating portion, more rollers could be used, or the design could made so that no such rollers are employed.

What is claimed is:

1. An apparatus for receiving film along a unit axis from an extruding apparatus for producing blown film and for providing film to other equipment, the apparatus comprising:

an oscillator for receiving film along an axis parallel to the unit axis and for rotationally oscillating about the parallel axis, the oscillator including a first turning bar for redirecting the film so that the film provided out from the oscillator is moved in a direction perpendicular to the unit axis, the film traveling along a first path length within the oscillator, the first path length varying as the oscillator oscillates;

a stationary portion, stationary relative to the oscillator, for receiving the film from the oscillator and for providing film out from the apparatus, the film travelling a second path length in the stationary portion before the film is provided out from the apparatus, the stationary portion including a movable roller for contacting the film while the film is in the stationary portion such that the second path length varies as the movable roller is moved; and a control system for moving the movable roller such that the sum of the first and second path lengths is kept constant.

2. The apparatus of claim 1, the stationary portion also including a first roller that is stationary relative to the movable roller, wherein film passes between the first roller and the movable roller.

3. The apparatus of claim 2, further comprising a second roller that is stationary relative to the movable roller, the film passing from the first roller to the movable roller to the second roller.

4. The apparatus of claim 3, wherein the movable roller is mounted in at least one track, the track being oriented so that the movable roller moves along an axis that is perpendicular to the direction that the film is provided from the apparatus.

5. The apparatus of claim 4, wherein the stationary portion includes a turning bar for turning the film from a vertical plane to a horizontal plane so that the film is provided from the hauloff in the horizontal plane.

6. The apparatus of claim 5, wherein the first roller, the second roller, and the movable roller are idlers.

7. The apparatus of claim 1, wherein the stationary portion includes a turning bar for turning the film from a vertical plane to a horizontal plane so that the film is provided from the apparatus in the horizontal plane.

8. The apparatus of claim 1, wherein the control system for moving the movable roller is mechanical and passive.

9. The apparatus of claim 1, wherein the control system includes a cable mounted to travel along a path similar to that which the film travels as the film moves from a first location in the oscillator to a second location in the stationary portion.

10. The apparatus of claim 9, wherein the cable is in contact with the movable roller such that rotation by the movable roller is unimpeded, and the cable is mounted so that the cable can move the movable idler as the cable moves.

11. The apparatus of claim 10, further comprising means for providing a tensioning force to the movable roller.

12. The apparatus of claim 1, wherein the oscillator oscillates 360°.

13. An apparatus for receiving blown film from an extruder, the apparatus comprising:

rollers for receiving the film from the extruder between the rollers;

means for oscillating the rollers and the film between the rollers, the oscillating means causing a first path length of the film to vary within the oscillating means; and means, receiving the film from the oscillating means, for providing the film out from the apparatus, the providing means including means for altering the path length of the film after the film leaves the oscillator means so that a total path length of the film, from the rollers to where the film is output, remains constant.

14. The apparatus of claim 13, the oscillating means including first turning means for receiving the film along a vertical direction, and for turning the film to provide the film along a horizontal direction and oriented in a vertical plane.

15. The apparatus of claim 14, wherein the providing means includes second turning means for receiving the film travelling in a horizontal direction and oriented in a vertical plane.

16. The apparatus of claim 13, wherein the means for altering includes a first roller, a second roller movable relative to the first roller, and a control system for moving the second roller relative to the first roller, the first and second rollers in contact with the film when the film is received from the oscillating means.

17. An apparatus for receiving film from an extruder, the apparatus comprises:

a stationary frame;

an oscillating portion including:
a frame,
a pair of rollers, mounted to the frame, for receiving the film from the extruder,
a turning bar coupled to the frame and positioned to receive film along a first axis to and to provide the film along a second axis perpendicular to the first axis, at least two fixed rollers positioned so that at least one fixed roller is in contact with the film after the film is provided from the turning bar, a motor for causing the frame to oscillate the pair of rollers, the at least two fixed rollers, and the turning bar about an axis parallel to the first axis, the oscillating motion being relative to the stationary frame, the oscillating motion causing the film to contact different ones of the fixed rollers as the film oscillates, and causing a first path length that the film travels to change within the oscillating portion as the frame oscillates;

a stationary portion positioned to receive film after film is provided from one or more of the at least two fixed rollers and including:

a first roller that is stationary relative to the stationary frame, and a second roller mounted for movement relative to the first roller and to the stationary frame, the film passing between the first roller and the second roller such that when the second roller moves, the distance the film travels from the first roller to the second roller varies; and a control system, responsive to changes in the first path length, for moving the second roller such that the distance the film travels from the first roller to the second roller increases as the first path length decreases, and the distance the film travels from the first roller to the second roller decreases as the first path length increases.

18. The apparatus of claim 17, further comprising a third roller that is stationary relative to the first roller and to the stationary frame, the third roller for receiving film from the second roller.

19. The apparatus of claim 17, wherein the control system includes a cable that extends at least from one of the at least one fixed rollers to the second roller, the cable positioned near the path of the film and moving the second roller as the first path length varies.

20. The apparatus of claim 19, further comprising pulleys adjacent each of the at least two fixed rollers in the oscillating portion, and the first and second rollers in the stationary portion, the pulleys allowing the cable to move along the path the film takes as the motor oscillates the frame.

21. A method for removing blown film from an extruder and for providing the film to another piece of equipment, the method comprising steps of:

receiving film from an extruder along a first axis and turning the film with a turning assembly to provide the film to a roller along a second axis different from the first axes;

oscillating the turning assembly about an axis parallel to the first axis and providing the film to a desired location, a first path that the film takes from the turning assembly to the desired location varying during the oscillating step; and varying a second path that the film travels from the desired location to the another piece of equipment such that the second path increases as the first path decreases and the second path decreases as the first path increases so that the path length of the film from the turning assembly to the piece of equipment remains constant and the speed of the film remains constant.

22. The method of claim 21, wherein the desired location is at a first roller, and wherein the film is provided between the first roller and a second roller, the varying step including moving one of the first and second rollers relative to the other.

23. In a vertical oscillating hauloff having an oscillating portion that receives film traveling along a first axis and provides the film along a second axis different from the first axis to a stationary portion as the oscillator is rotating about the first axis, a first path length of the film from within the oscillating portion to the stationary portion varying as the oscillating portion oscillates, a method comprising:

causing a second path length of the film within the stationary portion to vary by an amount equal and opposite to the first path length, such that the total of the first and second path lengths remains constant.

24. The method of claim 23, wherein the stationary portion includes a first roller and a second roller movable relative to the first roller to change the distance therebetween, the first and second rollers being in contact with the film, the causing step including moving the second roller relative to the first roller.

25. The method of claim 24, wherein the causing step is performed mechanically and passively, such that the oscillating portion and the stationary portion are mechanically linked, and a change of the first path length automatically causes movement of the second roller.

* * * * *